Aug. 3, 1926.

E. A. LAUGHLIN

CAR MOUNTING

Filed Oct. 18, 1921

1,594,621

3 Sheets-Sheet 1

Witnesses

Inventor
Elmyr A. Laughlin
By Joshua R. H. Potts
His Attorney

Aug. 3, 1926.

E. A. LAUGHLIN 1,594,621

CAR MOUNTING

Filed Oct. 18, 1921

3 Sheets-Sheet 2

Witnesses:

Inventor
Elmyr A. Laughlin
By Joshua R.H.Cott
His Attorney

Aug. 3, 1926.

E. A. LAUGHLIN 1,594,621

CAR MOUNTING

Filed Oct. 18, 1921.   3 Sheets-Sheet 3

Witnesses:

Inventor
Elmyr A. Laughlin
By Joshua R. H. Potts
His Attorney

Patented Aug. 3, 1926.

1,594,621

UNITED STATES PATENT OFFICE.

ELMYR A. LAUGHLIN, OF OREGON, ILLINOIS, ASSIGNOR TO FORT DEARBORN TRUST & SAVINGS BANK, TRUSTEE, OF CHICAGO, ILLINOIS.

CAR MOUNTING.

Application filed October 18, 1921. Serial No. 508,456.

My invention relates to improvements in car mountings, and more especially to center bearings therefor, the object of the invention being to provide a simple and efficient construction of this character whereby turning of the truck relatively to the car body is permitted, and friction incident to operation minimized.

Other objects will appear hereinafter.

The invention consists in the combinations and arrangements of parts hereinafter described and claimed.

Figure 1:
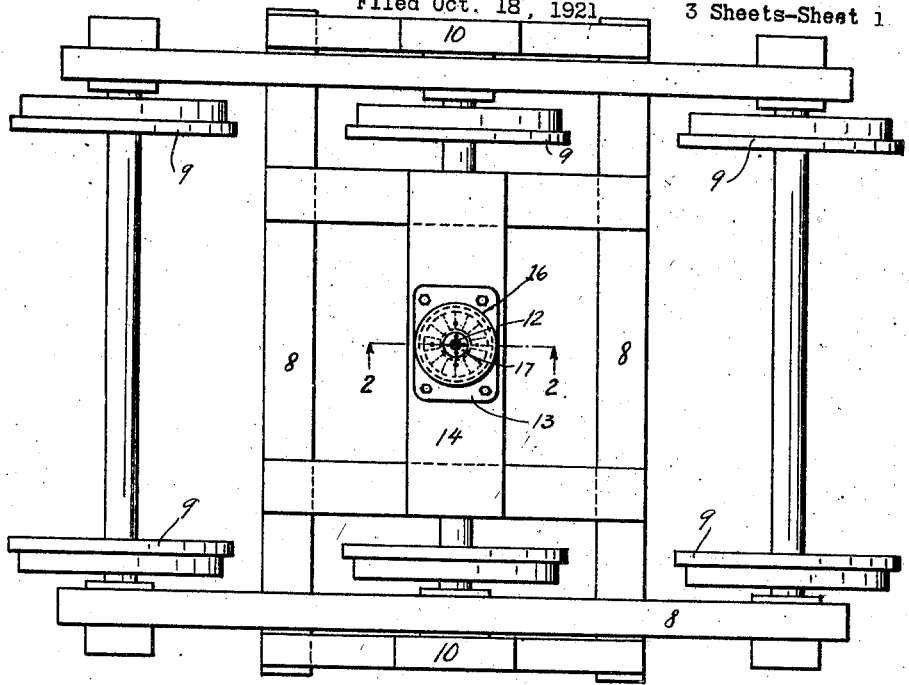
Figure 2:
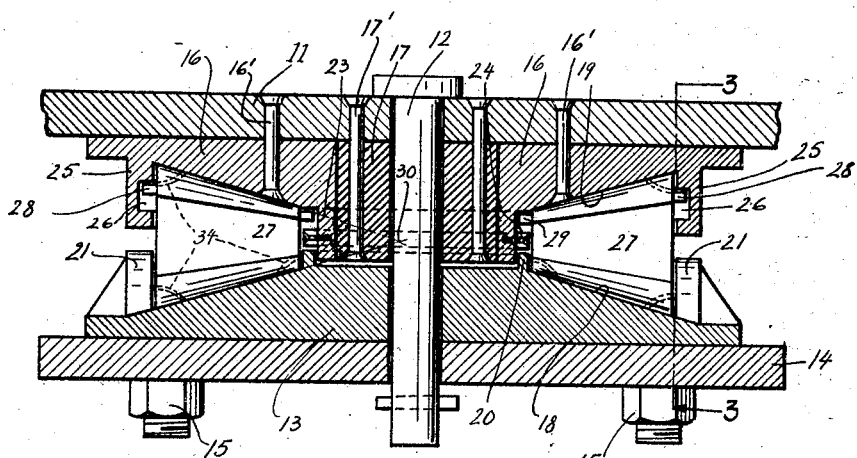

The invention will be best understood by reference to the accompanying drawings forming a part of this specification, and in which, Fig. 1 is a top plan view of a car truck equipped with car mounting means embodying the invention, Fig. 2 is an enlarged section taken on line 2—2 of Fig. 1.

Figure 3:
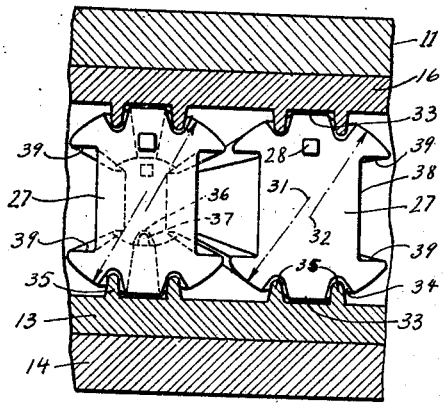
Figure 4:
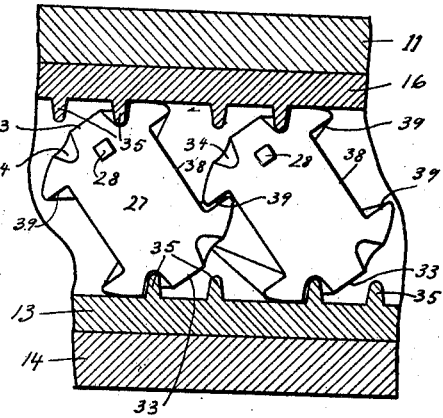
Figure 5:
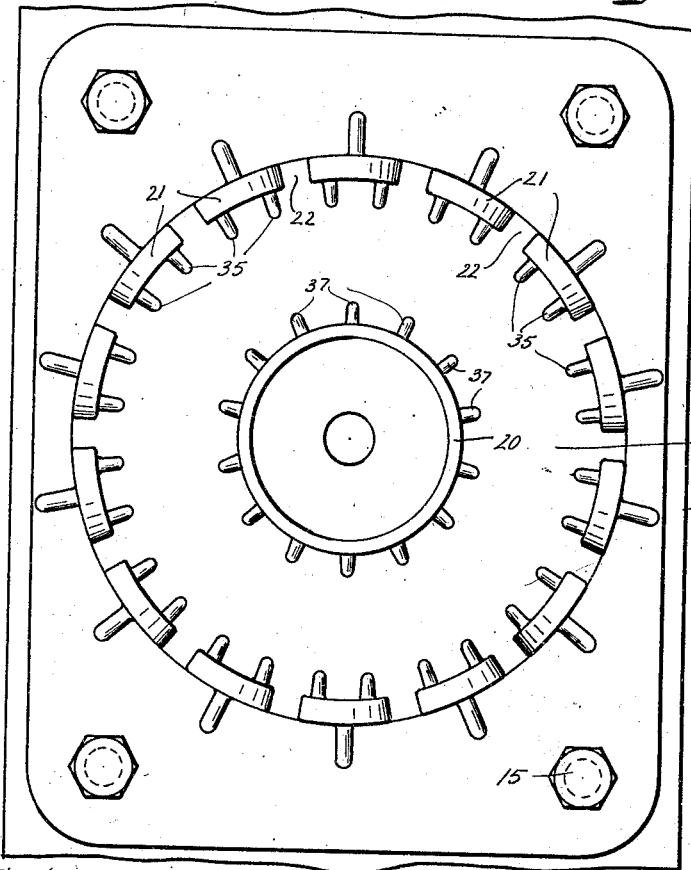
Figure 6:
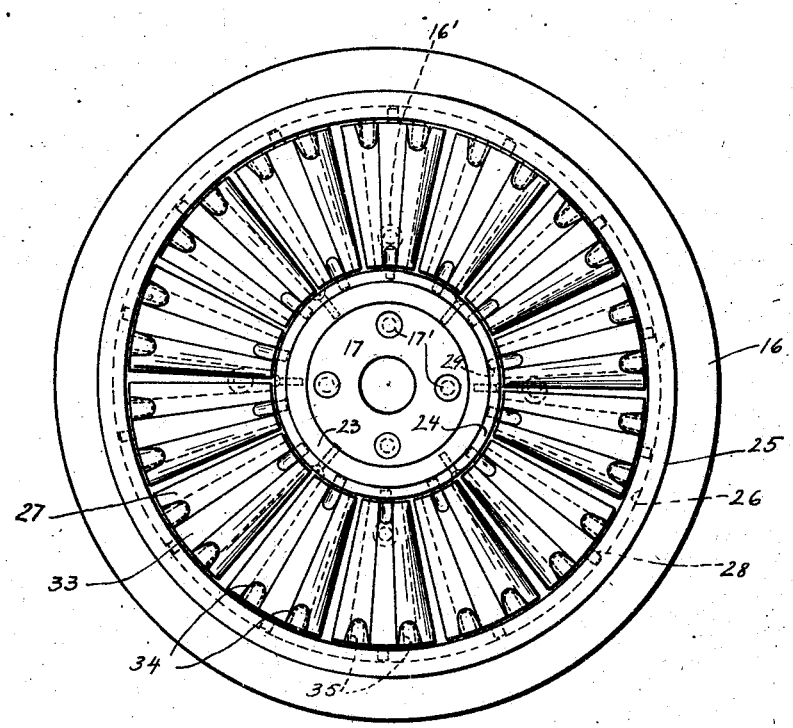
Figure 7:
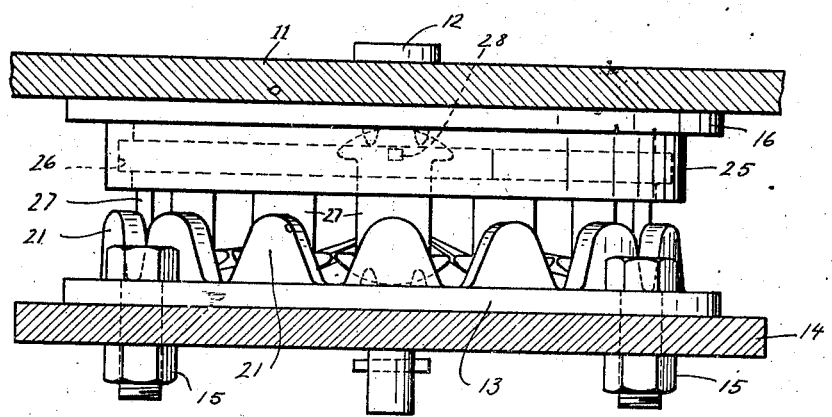

Fig. 3 is an enlarged detail view illustrating two of a plurality of rocker members employed in the construction in normal position of use, said view being taken on line 3—3 of Fig. 2, Fig. 4 is a similar view showing the positions assumed by said rockers when the truck turns, Fig. 5 is an enlarged top plan view of the lower bearing member with the bearing rockers removed, Fig. 6 is a bottom plan view of the upper bearing member with the rockers in place, and Fig. 7 is a side view, shown partially in section, of the mounting assembled.

The preferred form of construction as illustrated in the drawings, comprises a car truck 8 of any usual or desired construction and equipped with the usual flanged wheels 9 as indicated, said truck being also provided with any usual or desired form of side bearings 10 as shown.

The car body is provided at each end with a suitable body bolster 11 pivotally connected with the center of the truck 8 by means of a king bolt 12. A lower bearing member 13 is secured to the central supporting bolster 14 of the truck 8 by means of bolts 15 as indicated. A similar bearing member 16—17 is secured to each body bolster 11 by rivets 16'—17', said bearing members being centrally perforated for passage of the king bolt 12, and being arranged in superposed relation as shown. The bearing members 13 and 16 are provided with opposed conical bearing surfaces 18 and 19 surrounding the king bolt 12 as shown. A vertical and annular flange 20 is arranged at the inner edge of the bearing surface 18 and a series of lugs 21 are arranged annularly around the outer edge of said bearing surface with spaces 22 between them to facilitate the ready escape of dirt from the bearing. The upper bearing member 16 is provided with a central hub 23 fitting within the flange 20 as shown to reenforce the pivotal connection between the bearing members. A ring 24 is secured to the hub 23 thus forming an annular retaining groove above said ring as best shown in Fig. 2. The upper bearing 16 carries a depending annular flange 25 surrounding the outer edge of the bearing surface 19 and provided in its inner periphery with an annular groove 26 as shown.

A plurality of rotatable rockers 27 are arranged between the bearing surfaces 18 and 19 as shown, said rockers being substantially conical in form and arranged surrounding the pivotal axis of the bearing. Each rocker is provided at its outer end with a supporting lug 28 arranged at the upper central portion thereof and engaging the groove 26. A similar supporting lug 29 is arranged at the inner end of each rocker and engages the groove above the ring 24 and whereby said rockers are left free for rotation but will be suspended in the upper bearing member when the lower bearing member is removed, thus facilitating transportation, assembling and repairing of parts. The pitch of the conical bearing surfaces of the rockers 27 is comparatively sharp or steep so that their apices 30 are located on the adjacent sides of the pivotal axis. Or, in other words, the conical pitch of the rockers is such that if these surfaces were prolonged, they would converge at the point 30 before they reach the pivotal axis of the king bolt 12. By this arrangement, the effective outer diameters of said rockers are slightly greater than necessary to permit rolling or rocking of the rockers around the pivotal axis, and this excess of diameter tends to force the rockers toward the pivotal center as they roll or rock. The inward tendency of the rockers is due to the fact that by means of the arrangement set forth the outer effective rolling diameter is proportionately greater than the inner effective rolling diameter so that as the rocker rolls there necessarily is proportionately greater travel of the outer portion thereof than of the inner portion. The only way in which this proportionately greater travel of the outer portion of the rocker can take place is by the rocker traveling inwardly on the bearing members, and this inward travel of the rockers compensates for and overcomes the outward tendency thereon due to the inclination and consequent wedging action of the bearing members. This inward tendency of the rockers prevents outward thrust of the rockers against the lugs 21 and the flange 25, thus relieving strain and friction thereon and also tends to insure that all rockers make adequate contact with both surfaces 18 and 19, thus distributing the load. The lower bearing surfaces of the rockers 27 are conically formed on an upper axis 31 and the upper surfaces are conically formed on a lower axis 32 as indicated in Fig. 3, and whereby said rockers are given an eccentric shape. This eccentricity of the rockers has the effect of increasing the effective diameters thereof as they roll or rock, and this increase of effective diameters causes a corresponding elevation of the car body as the rockers move when the truck turns on a curve. This elevation of the car body is forced against the weight thereof so that when the truck again straightens on a straight track, the weight of the car automatically returns the truck to straight ahead position, thus eliminating friction between the flanges of the wheels and the inner sides of the rails. Each of the rockers 27 is also provided on each bearing surface with a central flat spot or area 33 which has a tendency to more effectively retain the trucks in straight ahead position and which causes quick preliminary elevation of the body upon turning and correspondingly quick return on the straight track. Most of the travel of a car is on a straight track and these flat spots or areas provide large bearing and wear surfaces during such travel. Each rocker is also provided at its outer edges with recesses 34, there being two of said recesses in both the upper and lower outer edges. These recesses extend across the corners of the rockers so that the bottoms of the recesses are inclined, thus facilitating the automatic discharge of dirt and grit therefrom. Corresponding lugs or teeth 35 are arranged at the outer edges of the bearing surfaces 18 and 19 to fit and engage the recesses 34. Corresponding recesses 36 and lugs 37 are provided at the inner lower edges of the rockers and the bearing surface 18 as indicated. The interfitting engagement between these lugs and recesses effects a sort of a rack bar connection between the rockers and the bearing members and whereby sliding between said rockers and members is prevented but free rocking or rolling of the rockers permitted. This insures movements of the rockers with the bearing members when the truck turns and prevents the rockers from working out of proper positions during service. The sides of the rockers 27 are recessed at 38 and abrupt stop shoulders 39 are provided at the tops and bottoms of said recesses whereby when the rockers roll or tip, as indicated in Fig. 4, the tops of the rockers enter these recesses and the stop shoulders 39 engage to limit the extent of the movement. This arrangement permits the use of a comparatively large number of rockers in a comparatively small space with free movement between them and with adequate extent of bearing surfaces. Inasmuch as the car mounting disclosed is designed and intended to carry the entire load of the car, it is highly desirable to employ as many of the rockers as possible so as to distribute the load and provide adequate carrying surfaces therefor.

As will be noted, the upper bearing member 16—17 is made in two parts, an outer ring 16 constituting the bearing member proper and an inner hub 17 fitting within the central bore or opening of the ring 16 as shown. The central hub 17 is centrally perforated for the passage of the king bolt 12 and is permanently secured to the corresponding body bolster 11 by means of rivets 17'. The bearing rings 16 are secured to the corresponding body bolster 11 by means of soft iron rivets 16' which are strong enough to hold said bearing ring in place during ordinary usage but will shear under undue strain and thus permit the bearing ring 16 to turn or rotate with reference to the bolster 11 under such circumstances. By this arrangement in case the rockers 27 should become clogged with ice or dirt, or in case one or more of them should break and thus prevent movement thereof and relative movement between the bearing members 13 and 16, the rivets 16' will shear when the car runs onto the curve and thus permit of pivotal movement between the truck and car to prevent derailment of the car under such circumstances.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. The combination with a car body and truck therefor, of a pivotal connection between them; opposed substantially conically shaped bearing members on said body and truck, surrounding said pivotal connection; and rotatable bearings interposed between said bearing members and surrounding said pivotal connection, the bearing surfaces of said rotatable members being substantially conically shaped with their apices falling on the adjacent sides of the pivotal axis to roll upon said bearing members under load, there being a flat spot at substantially the center of one bearing surface of each of said rotatable bearings, substantially as described.

2. The combination with a car body and truck therefor, of a pivotal connection between them; opposed substantially conically shaped bearing members on said body and truck, surrounding said pivotal connection; rotatable bearings interposed between said bearing members and surrounding said pivotal connection, the bearing surfaces of said rotatable bearings being substantially conically shaped with their apices falling on the adjacent sides of the pivotal axis to roll upon said bearing members under load, there being a flat spot at substantially the center of each bearing surface of each of said rotatable bearings; and interfitting lugs and recesses preventing sliding, but permitting rolling, of said rotatable bearings with reference to said bearing members, substantially as described.

3. The combination with a car body and truck therefor, of a pivotal connection between them; opposed substantially conically shaped bearing members on said body and truck, surrounding said pivotal connection; rotatable bearings interposed between said bearing members and surrounding said pivotal connection, the bearing surfaces of said rotatable bearings being substantially conically shaped with their apices falling on the adjacent sides of the pivotal axis to roll upon said bearing members under load; and interfitting lugs and recesses preventing sliding, but permitting rolling, of said rotatable bearings with reference to said bearing members, substantially as described.

4. The combination with a car body and truck therefor, of a pivotal connection between them; opposed substantially conically shaped bearing members on said body and truck, surrounding said pivotal connection, rotatable bearings interposed between said bearing members and surrounding said pivotal connection, the bearing surfaces of said rotatable bearings being plain and substantially conically shaped with their apices falling on the adjacent sides of the pivotal axis to roll upon said bearing members under load, there being a flat spot at substantially the center of one of said bearing surfaces of each of said rotatable bearings; and interfitting lugs and recesses preventing sliding, but permitting rolling, of said rotatable bearings with reference to said bearing members, substantially as described.

5. The combination with a car body and truck therefor, of a central pivotal connection between them; opposed substantially conically shaped bearing members on said body and truck, surrounding said pivotal connection; rotatable bearings interposed between said bearing members and surrounding said pivotal connection, the bearing surfaces of said rotatable bearings being plain and substantially conically shaped with their apices on the adjacent sides of the pivotal axis to roll upon said bearing members under load; and interfitting lugs and recesses preventing sliding, but permitting rolling, of said rotatable bearings with reference to said bearing members, substantially as described.

6. The combination with a car body and truck therefor, of a central pivotal connection between them; opposed conically shaped bearing members on said body and truck, surrounding said pivotal connection; and conically shaped rocker members interposed between said bearing members and surrounding said pivotal connection with apices falling on the adjacent sides of the pivotal axis to roll upon said bearing members under load, the adjacent sides of said rockers being recessed to receive the tops of the adjacent rockers when tipped, substantially as described.

7. The combination with a car body and truck therefor, of a central pivotal connection between them; opposed bearing members on said body and truck, surrounding said pivotal connection; and eccentric conical rocker members interposed between said bearing members and surrounding said pivotal connection, substantially as described.

8. The combination with a car body and truck therefor, of a central pivotal connection between them; opposed bearing members on said body and truck, surrounding said pivotal connection; and eccentric conical rocker members interposed between said bearing members and surrounding said pivotal connection, the adjacent sides of said rockers being recessed to receive the tops of the adjacent rockers when tipped, substantially as described.

9. The combination with a car body and truck therefor, of a central pivotal connection between them; opposed bearing members on said body and truck, surrounding said pivotal connection; and eccentric conical rocker members interposed between said bearing members and surrounding said pivotal connection, the adjacent sides of said rockers being recessed to receive the tops of the adjacent rockers when tipped, and the bearing surfaces of said rockers being curved and provided with a central flat spot, substantially as described.

10. The combination with a car body and truck therefor, of a central pivotal connection between them; opposed bearing members on said body and truck, surrounding said pivotal connection; eccentric conical rocker members interposed between said bearing members and surrounding said pivotal connection; and means preventing sliding, but permitting rolling, of said rockers, substantially as described.

11. The combination with a car body and truck therefor, of a central pivotal connection between them; opposed bearing members on said body and truck, surrounding said pivotal connection; eccentric conical rocker members interposed between said bearing members and surrounding said pivotal connection, the adjacent sides of said rockers being recessed to receive the tops of the adjacent rockers when tipped; and means preventing sliding, but permitting rolling, of said rockers, substantially as described.

12. The combination with a car body and truck therefor, of a central pivotal connection between them; opposed bearing members on said body and truck, surrounding said pivotal connection; eccentric conical rocker members interposed between said bearing members and surrounding said pivotal connection, the adjacent sides of said rockers being recessed to receive the tops of the adjacent rockers when tipped, the bearing surfaces of said rockers being curved and provided with a central flat spot; and means preventing sliding, but permitting rolling, of said rockers, substantially as described.

13. The combination with a car body and truck therefor, of a central pivotal connection between them; opposed bearing members on said body and truck, surounding said pivotal connections; and eccentric conical rocker members interposed between said bearing members and surrounding said pivotal connection, said rocker and bearing members having plain bearing surfaces, substantially as described.

14. The combination with a car body and truck therefor, of a central pivotal connection between them; opposed bearing members on said body and truck, surrounding said pivotal connection; eccentric conical rocker members interposed between said bearing members and surrounding said pivotal connection, said rocker and bearing members having plain bearing surfaces; and means preventing sliding, but permitting rolling, of said rockers, substantially as described.

15. The combination with a car body and truck therefor, of a central pivotal connection between them; opposed bearing members on said body and truck, surrounding said pivotal connection; and rotatable bearings interposed between said bearing members and surrounding said pivotal connection, the bearing surfaces of said rotatable bearings being substantially conically shaped with their apices falling on the adjacent sides of the pivotal axis to roll upon said bearing members under load, substantially as described.

16. The combination with a car body and truck therefor, of a central pivotal connection between them; opposed bearing members on said body and truck, surrounding said pivotal connection; rotatable bearings interposed between said bearing members and surrounding said pivotal connection, the bearing surfaces of said rotatable bearings being substantially conically shaped with their apices falling on the adjacent sides of the pivotal axis to roll upon said bearing members under load; and means preventing sliding, but permitting rolling, of said rotatable bearings, substantially as described.

17. The combination with a car body and truck therefor, of a central pivotal connection between them; opposed bearing members on said body and truck, surrounding said pivotal connection; rotatable bearings interposed between said bearing members and surrounding said pivotal connection, the bearing surfaces of said rotatable bearings being substantially conically shaped with their apices falling on the adjacent sides of the pivotal axis to roll upon said bearing members under load; and interfitting lugs and recesses preventing sliding, but permitting rolling, of said rotatable bearings, substantially as described.

18. The combination with a car body and truck therefor, of a central pivotal connection between them; opposed bearing members on said body and truck surrounding said pivotal connection; a plurality of upstanding lugs at the outer edge of the lower of said bearing members, there being dirt escape spaces between said lugs; and rotatable bearings interposed between said bearing members and surrounding said pivotal connection, substantially as described.

19. The combination with a car body and truck therefor, of a central pivotal connection between them; opposed conically shaped bearing members on said body and truck surrounding said pivotal connection; a plurality of upstanding lugs at the outer edge of the lower of said bearing members, there being dirt escape spaces between said lugs; and rotatable conically shaped bearings interposed between said bearing members and surrounding said pivotal connection, substantially as described.

In testimony whereof I have signed my name to this specification.

ELMYR A. LAUGHLIN.